May 15, 1923.
N. O. NILSSON
RAT TRAP
Filed May 11, 1922
1,454,941
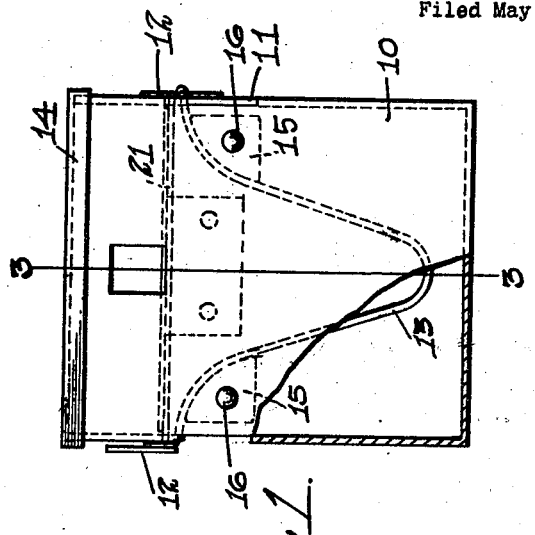
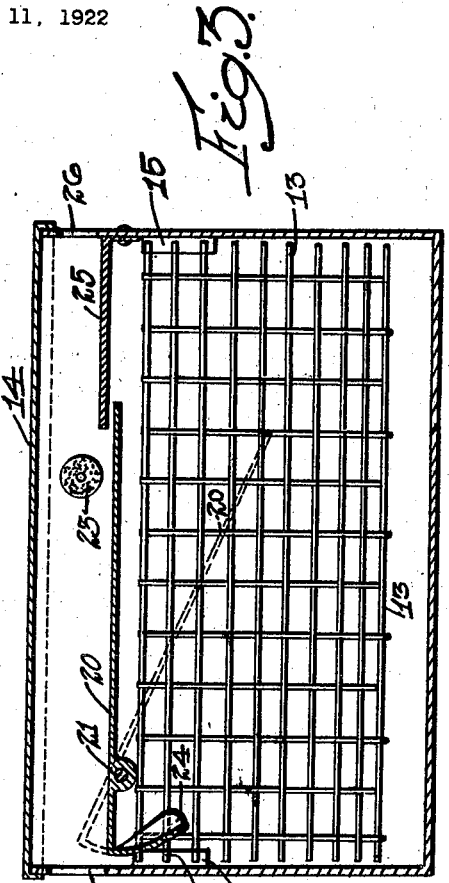
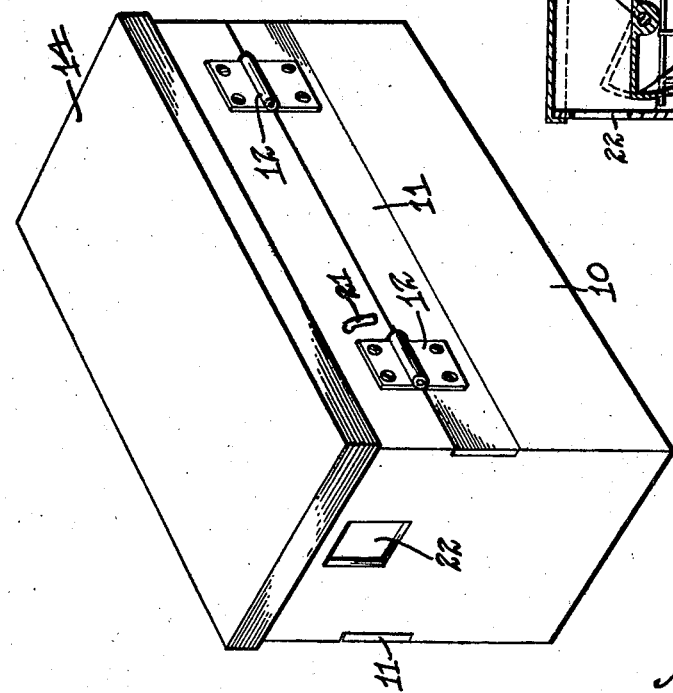
Inventor:
Nils O. Nilsson
By Attorneys.

Patented May 15, 1923.

1,454,941

UNITED STATES PATENT OFFICE.

NILS OSCAR NILSSON, OF WORCESTER, MASSACHUSETTS.

RAT TRAP.

Application filed May 11, 1922. Serial No. 560,190.

*To all whom it may concern:*

Be it known that I, NILS O. NILSSON, a citizen of the United States, residing at Worcester, in the county of Worcester and State of Massachusetts, have invented a new and useful Rat Trap, of which the following is a specification.

The principal objects of this invention are to provide a rat trap in a form in which it can be employed as a feed hopper for hens or as a drinking trough; to provide it with a tilting platform that will deposit the rats in the bottom of the feed hopper or drinking fountain, and at the same time control the entrance opening from below, so that the rats cannot get out. The invention also involves other objects and advantages as will appear.

Reference is to be had to the accompanying drawing in which—

Fig. 1 is an end view of a trap constructed in accordance with this invention, partly broken away, to show interior construction;

Fig. 2 is a perspective view of the device; and

Fig. 3 is a central longitudinal sectional view on the line 3—3 of Fig. 1.

I have shown the trap as comprising a box 10 preferably made of sheet metal so that its corners and edges can be sealed so that it can be used for holding water in the bottom either for use as a drinking fountain for hens or for drowning the rats that are caught in it. If it is not desired to introduce water into it, it can be filled at the bottom with grain or feed for the hens.

In order to provide for the use of the feed hopper or watering trough for fowls the box is provided with two horizontal doors 11 having hinges 12 at the top or bottom adapted to be turned either up or down as indicated in Fig. 1 for permitting the hens to have access to the contents below from the sides. By having these doors extend throughout the whole length of this box it will accommodate several fowls at the same time although built in compact form.

For the purpose of facilitating the use of the device for feeding grain and preventing the scattering of the same and the introduction of foreign substances therein I have shown a screen 13 of a general U-shape located along the center of the box and extending nearly to the bottom thereof. The feed is dumped in at the top which is closed by a readily removable cap 14 and falls down into the screen and some of it through it on the floor from which it is picked up by the hens through the openings in which the doors 11 are located. Generally feed is inclined to hold together somewhat, and the screen tends to hold it up for the fowls to pick at through the screen. The screen is removed from the device when it is to be used as a trap if it is so constructed as to interfere with the operation of the tilting platform. The device is shown as centrally mounted or exactly the same on both sides. The screen 13 can be held in any desired way, but preferably is removably mounted in position by means of ears 15 and screws or bolts 16 extending through or into the end walls.

The parts so far described relate to the position of the device as a feed hopper or watering trough and the screen preferably is used in either case. The parts which cooperate with those above described for the purpose of catching rats are located in the top. The principal thing is a tilting platform 20 pivoted on a rod 21 which extends through the sides and preferably is removably mounted so that the tilting platform can be taken out if desired. This platform is located above the level of the screen and just at the bottom of an end opening 22 which constitutes an entrance for the rodents. The bottom of this opening is on a level with the platform. Bait may be located on the extreme end of the platform or hung on the side walls at 23 if desired. When a rat enters the opening 22 and walks out on the platform toward the bait it will soon overbalance the platform and tilt it into the dotted line position shown in Fig. 3. The rat cannot go up the platform on account of its tipping down, and as soon as he leaves it, it will tilt back into the full line position, being brought back to position always by a weight 24 on its rear end. This weight is shown as curved to constitute means for closing the opening 22 from below when the platform is tilted so that a rat previously caught cannot get out at that point. The weight holds the end of the tilting platform 20 up against a stationary platform 25 at the opposite end of the trap. This constitutes a stop for the tilting platform, although any stationary means can be employed.

I find that rats will not enter this trap unless there is a second opening 26 at the other end, which they can see through.

This opening is provided just above the platform 25 and if a rat enters from that end he will walk out on the stationary platform 25 toward the bait 23 which is far enough off so that he cannot reach it without bringing his weight on the free end of the tilting platform 20, so in either case the result is the same.

The screen 13 can be removed if desired when the device is to be used as a rat trap, because ordinarily it will not be desired to have the grain in place at that time, but it will be understood that by designing the outline of the platform 20 properly it can be used with the screen in place, and any way it can be used without removing the grain if desired.

Although I have illustrated and described only a single form of the invention and shown it as constructed to be used in connection with a feed hopper or watering trough, I am aware of the fact that modifications can be made therein and that it can be used without the features of the feed-hopper, and therefore I do not wish to be limited to all the details of construction herein shown and described but what I do claim is:—

1. In a rat trap, the combination of a feed box having an opening at each end near the top, a platform pivoted adjacent to one of said openings and having the free end extending from it inwardly toward the other, a stop near the other end for limiting the upward motion of the platform, a weight on the platform near the end of the box for holding it up against the stop, and means for locating bait near the free end of the platform, said box having a horizontal door along the side by which fowls can have access to grain or water located in the bottom of it below the platform.

2. In a rat trap, the combination of a feed box having an opening at each end near the top, a platform pivoted adjacent to one of said openings and having the free end extending from it inwardly toward the other, a stop near the other end for limiting the upward motion of the platform, a weight on the platform near the end of the box for holding it up against the stop, said box having a horizontal door along one side by which fowls can have access to grain or water located in the bottom of it, said door being located at a level lower than said openings, a screen under the platform slanting from a position above the opening to a point near the bottom and at a distance from that side of the box, and a readily removable cover for the box.

In testimony whereof I have hereunto affixed my signature.

NILS OSCAR NILSSON.